Patented Aug. 7, 1923.

1,463,905

UNITED STATES PATENT OFFICE.

NIELS D. NIELSEN, OF ELYRIA, OHIO.

RUBBER COMPOSITION.

No Drawing.   Application filed May 31, 1918.   Serial No. 237,509.

*To all whom it may concern:*

Be it known that I, NIELS D. NIELSEN, a citizen of the United States, residing at Elyria, in the county of Lorain and State of Ohio, have invented certain new and useful Improvements in Rubber Compositions; and I do hereby declare the following to be a full, clear, and exact description of the invention, such as will enable others skilled in the art to which it appertains to make and use the same.

The object of my invention is to improve the qualities of rubber (or caoutchouc), or rubber compositions, or to produce a new article of commerce, one of the ingredients of which is rubber or a composition thereof.

Rubber, either vulcanized or unvulcanized, is highly flexible and resilient, but its well known limited toughness and wearing qualities restrict its use and shorten the life of the articles made thereof. I aim to increase the toughness and the wearing qualities of rubber and rubber compositions without reducing or materially reducing the other valuable qualities which are possessed by the rubber or its compositions. This I do by adding to the rubber or composition thereof, thin, roughened flakes of a tough, flexible and resilient material, such as common fish scales, which are to be found in large quantities in the waste heaps about fish cleaning establishments and the like.

Fish scales are very flexible and resilient, and therefore, possess two of the valuable properties of rubber and its compositions. Moreover, such scales are so tough and durable as to be practically indestructible under ordinary conditions. I have found by actual experiments that few things, except strong mineral acids, will injure them. In addition, the surfaces of fish scales are very rough, microscopically speaking, being pitted with small crevices, generally in the shape of grooves. When mixed with rubber or the like, the rubber or the like enters or is forced into these crevices, so that the scales are firmly sealed to the rubber and bind the particles thereof together, greatly increasing its toughness and greatly resisting all efforts to blow, tear or otherwise cause holes or openings therein. The scales being thin and flexible, are easily bent when used, and add greatly to the toughness and durability of the rubber or composition. Of course, the scales do not materially reduce the flexibility or resiliency of the rubber. As a matter of fact, for many purposes, such properties may be reduced somewhat, without impairing the usefulness of the rubber. I find that my invention is of especial merit in composition for such uses. I contemplate many uses of my invention, but find its properties most useful (as far as I have investigated) with rubber tires, shoe parts, belting, hose, mats and the like.

As will readily be appreciated, the fish scales are to be secured in large quantities at a very small cost, being a by-product of the fish industry, generally a waste, and frequently a nuisance.

The raw scales are thoroughly cleaned, in any suitable manner, before being mixed with the rubber, and may be used as a whole or chopped up into pieces, such as strips, or other suitably shaped particles, before the mixing. They may, if desired, be colored to suit the tint or shade of the article to be manufactured from the compound. I contemplate the mixture of fish scales with any and all suitable kinds of rubber, but by far the greatest field is found with vulcanized rubber articles.

The scales (or parts thereof) when properly prepared, are thoroughly mixed with the rubber or its composition, so as to, as nearly as possible, equally distribute the scales or particles thereof uniformly through the mixture. The kneading should be so thorough that the rubber or the like is caused to flow or is forced into all or substantially all the crevices in the scales, to better seal the scales to the rubber and bind the mass together. This can conveniently be done on the mixing rolls, usually employed about rubber factories. Where the rubber is to be vulcanized, this mixing may take place before the vulcanizing, as the scales are not affected by any pressure, heat or cold ordinarily encountered in commerce. The rubber, or rubber and other materials to be used in the compound, may be thrown with the vulcanizing substance and the fish scales upon the slowly revolving heated rolls and kept there until suitably mixed.

The proportion of scales to rubber or composition used may be varied to suit the particular use to which the material is to be employed. For example, where the material is to be used for insulation purposes, larger quantities of such scales may be employed.

While I have mentioned fish scales as the particular article which possesses the desired properties and as suitable, it will be apparent that I may use other articles possessing the salient virtues of the scales, without departing from the spirit of my invention, as expressed in my broader claims.

I claim:

1. As an article of commerce, the combination of vulcanized rubber and fish scales.

2. As an article of commerce, the combination of vulcanized rubber and fish scales embedded in said rubber.

3. As an article of commerce, the combination of rubber, fish scales and a rubber vulcanizing material thoroughly mixed together and the rubber vulcanized with the fish scales therein.

4. As an article of commerce, the combination of rubber, fish scales and a rubber vulcanizing material thoroughly mixed together and the rubber vulcanized with the fish scales and other substance therein.

5. The method of improving the toughness and wearing qualities of rubber or rubber compositions, which consists in mixing with such rubber or composition fish scales or parts thereof.

6. The method of producing an article of commerce, which consists in mixing together, at a suitable temperature, rubber, fish scales (or parts thereof) and a rubber vulcanizing material and vulcanizing the rubber with the fish scales therein.

7. As an article of commerce, a composition containing vulcanized rubber and fish scales with portions of the rubber projecting into the crevices in the fish scales.

8. As an article of commerce, a composition containing vulcanized rubber and a plurality of thin, roughened flakes, of a tough, durable, flexible and resilient material mixed with such rubber in suitable quantities.

9. In a composition, the combination with vulcanized rubber of a plurality of thin, roughened flakes of durable, tough, flexible and resilient material mixed in such rubber, and firmly secured therein.

10. The method of producing a composition of the class described, which consists in mixing upon heated rolls rubber, a vulcanizing material, and thin, roughened flakes of tough, durable, flexible, resilient material, and then vulcanizing such mixture.

11. The method of producing a composition of the class described which consists in mixing rubber, vulcanizing material, and fish scales together, and then vulcanizing such mixture.

In witness whereof, I have hereunto signed my name this 27 day of May, 1918.

NIELS D. NIELSEN.